United States Patent [19]

Allen

[11] 3,937,102
[45] Feb. 10, 1976

[54] NOISE SUPPRESSION

[76] Inventor: Clayton H. Allen, 651 Concord Ave., Cambridge, Mass. 02138

[22] Filed: July 22, 1974

[21] Appl. No.: 490,311

[52] U.S. Cl. .................. 74/569; 74/57; 242/43 R; 242/158.5
[51] Int. Cl.² ........................................ F16H 53/06
[58] Field of Search ............. 74/569, 567, 57; 242/158.5, 158.3, 43

[56] References Cited
UNITED STATES PATENTS

| | | | |
|---|---|---|---|
| 2,803,456 | 4/1958 | Stafford | 242/158.5 X |
| 3,344,685 | 10/1967 | Crovzet | 74/57 X |
| 3,672,587 | 6/1972 | Pierce | 242/43 |
| 3,799,464 | 3/1974 | Bosch | 74/57 X |
| 3,836,087 | 9/1974 | Tschentscher | 242/158.5 |

*Primary Examiner*—Benjamin W. Wyche
*Assistant Examiner*—F. D. Shoemaker
*Attorney, Agent, or Firm*—Charles Hieken, Esq.; Jerry Cohen, Esq.

[57] ABSTRACT

Noise generation by machines having cam driven reciprocating elements is reduced in a machine wherein the cam-follower linkage comprises a double walled cam slot, a follower roller within the slot and spring means for moving the follower from the trailing wall to the leading wall of the cam slot.

10 Claims, 6 Drawing Figures

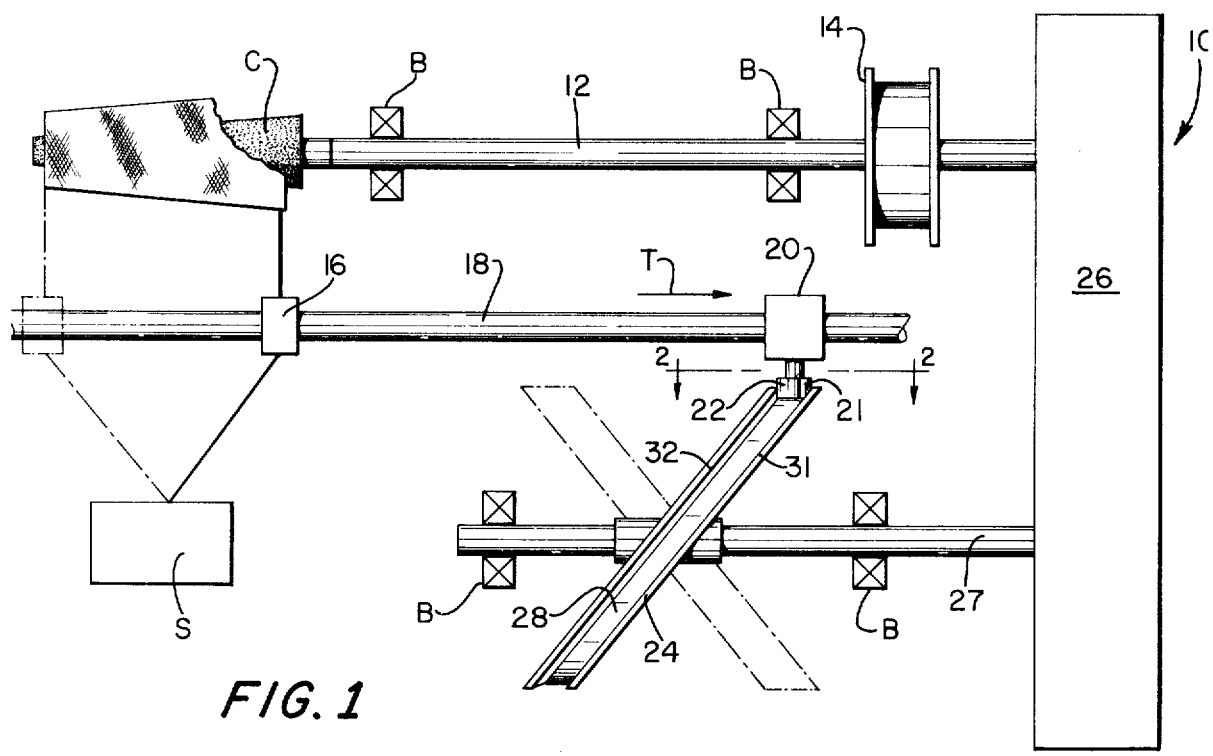
FIG. 1
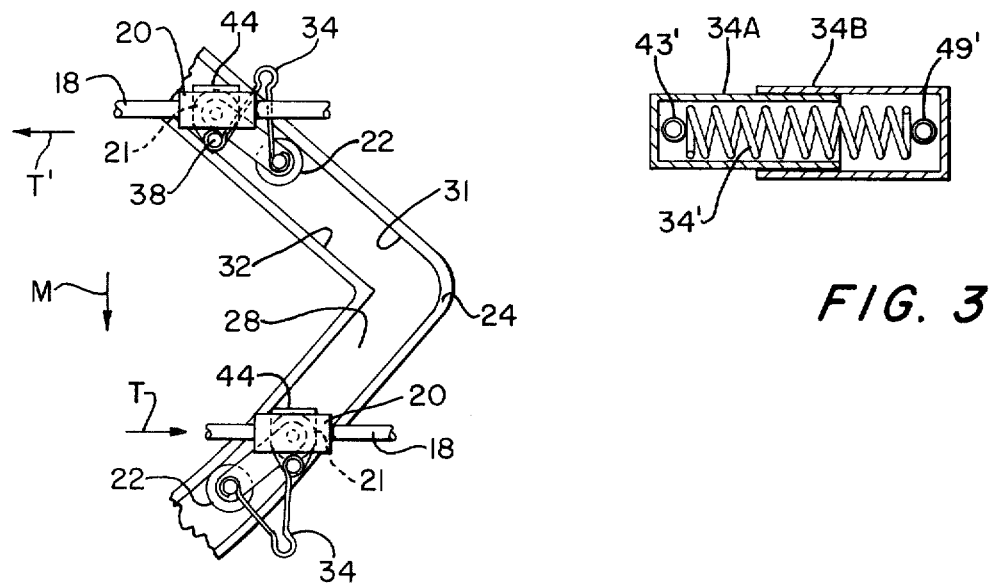
FIG. 2
FIG. 3

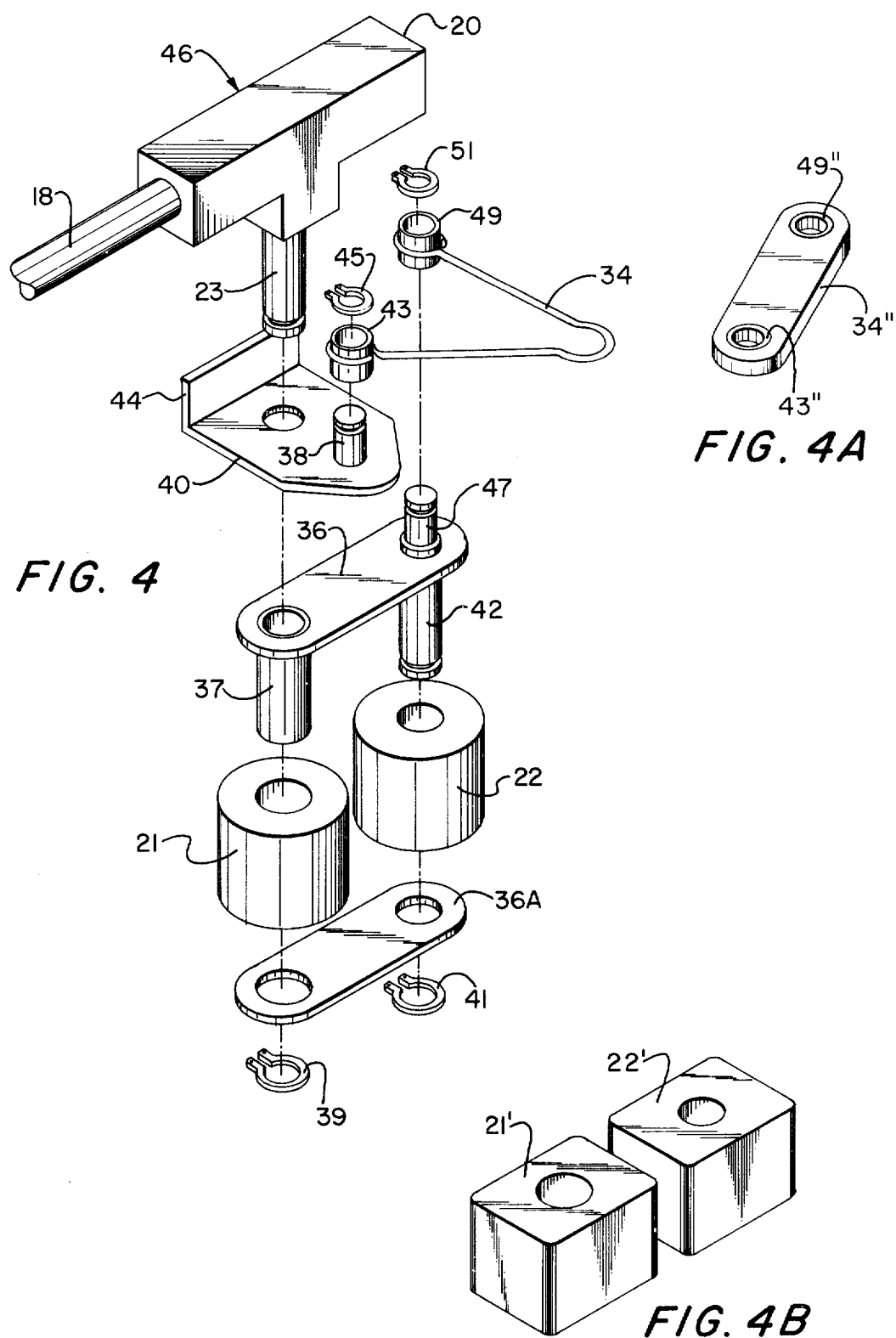

NOISE SUPPRESSION

BACKGROUND OF THE INVENTION

The present invention relates generally to machine noise suppression and more particularly to improved machines of the type having cam driven traverse mechanisms, such as coning machines. The invention is characterized by low noise and vibration generation, and it may be embodied in new machines or in modifications to prior art machines.

Coning machines, widely used in the textile industry, are typical of a larger class of machine employing a traverse rod or other traversing element carrying a small roller or other follower that is confined in a groove of a rotating cam or otherwise subjected to a back-and-forth camming action. The rotating cam groove, or the like, enforces a substantially linear back-and-forth motion upon the traverse rod or other traversing element. Impacts made by such mechanisms under typical production operating conditions of high speed and close spacing between machines, characteristically produce airborne noise levels that are hazardous to the hearing of operating personnel and others employed in the area. Such impacts also cause wear in the working parts and excessive impulsive loading upon the driving gear train which causes wear and fatigue in the gears, particularly when plastic gears are used as a means for aiding noise reduction. Vibrations from such impacts can also travel through the machine structure and generate noise at other machine parts.

To illustrate the scope of the problem, the textile coner, a machine which rotates a cardboard cone while feeding a textile filament or the like onto the cone via a traversing guide, is normally used in large numbers closely spaced in a production area, and under these conditions the resulting combined noise exceeds the noise limits of the United States Occupational Safety and Health Act standards. There are several hundred thousand of such machines extant.

Accordingly, it is an important object of the invention to provide traversing machines with means for reducing the above-described impact noise and vibration generation.

It is a further and more specific object of the invention to achieve the preceding object with coning machines meeting the noise limits of the Occupational Health and Safety Act standards under normal production operating speeds and configuration.

It is a further object of the invention to avoid interference with basic machine designs and coning performance consistent with one or both of the preceding objects.

It is a further object of the invention to provide low cost and simple low noise, traversing means consistent with one or more of the preceding objects.

It is a further object of the invention to achieve one or more of the preceding objects with noise traversing construction which is reliable, reduces wear and permits faster machine operation.

It is a further object of the invention to provide a low noise traversing method which is simple and effective consistent with one or more of the preceding objects.

It is a further object of the invention to provide a retrofit capability for existing machines, as well as improved low noise designs for new machines, consistent with one or more of the preceding objects.

SUMMARY OF THE INVENTION

According to the invention, the cam surface-cam follower linkage for effecting traverse motion comprises a cam slot with opposed walls. At any given point in the cam cycle, one of the opposed walls is a leading wall and the other is a following wall with respect to the direction of traverse at the moment. The cam follower has at least some play between the walls to avoid binding. In the absence of specific steps or means adapted to achieve a contrary result, the follower tends to lean against the trailing wall of the cam which forces the follower along its course of traverse, and then near the end of the substantially linear traverse stroke, the trailing wall turns sharply backward while the follower, propelled by its momentum (including the momentum of the entire traverse mechanism), slams against the leading wall, which is also turning backward, thereby generating impact noise and vibration. According to the present invention a shifting means shifts the follower from its contact with the trailing wall into firm contact with the leading wall during the relatively long interval of substantially linear traverse so that the follower will be already in contact with the leading wall at the start of the high acceleration interval of reversal in traverse direction, thereby eliminating the aforementioned impact and enforcing the smooth controlled reversal motion designed into the leading wall of the cam.

The force required to accomplish the shift of the follower from the trailing wall to the leading wall is small compared with the force required to cause reversal of the direction of traverse since there is small or substantially zero acceleration of the traverse during the shifting interval. Also the force required to cause a smooth controlled reversal of the traverse direction when the follower is in contact with the leading wall of the cam is very small compared with the force encountered at the end of the uncontrolled, ballistic course of the traverse motion as the follower leaves the trailing wall and impacts the leading wall of the cam.

Numerous other objects, features and advantages of the invention will be apparent from the following detailed description of preferred embodiments, taken in connection with the accompanying drawing in which:

BRIEF DESCRIPTION OF THE DRAWING

FIG. 1 is a side view of a portion of a coner, with noise reduction means for its traversing element, in accordance with a preferred embodiment of the invention;

FIG. 2 is a top view of a portion of the FIG. 1 embodiment with the cam surface unrolled into a horizontal plane for clarity of illustration of the function of the invention;

FIG. 3 is a sectional view of a modified spring part for use in the apparatus of FIGS. 1-2 according to a second preferred embodiment, and FIG. 4 is an exploded side view of the first preferred embodiment of the invention, FIGS. 4A and 4B showing alternates to the rollers and spring, respectively.

DETAILED DESCRIPTION OF PREFERRED EMBODIMENTS

Referring now to the drawing and more particularly FIG. 1, there is shown a side view of a portion of a coning machine unit 10 comprising a spindle 12 with a motor and belt powered sheave drive 14 therefor incororating the invention. The unit may be one of several driven from a common motor connected via belts to their respective sheaves 14 for driving their respective spindles 12, or it may be part of a one-unit machine. A cardboard cone C is mounted on the spindle, and a source of fiber S feeds out fiber to the cone via a reciprocating guide element 16 mounted on a traverse rod 18. The traverse rod has a head 20 mounted thereon supporting a cam follower roller 21 at the leading portion of the cam follower on a rigid axle 23 and a secondary roller 22 via a carrier linkage 36 and pin 42 (FIG. 4).

A cam element 24 is driven off sheave 14 and spindle 12 via a gear train 26 and shaft 27 to convert the rotary motion of the shaft drive to a reciprocating traverse motion of the follower. Fixed guide structure (not shown) prevents rotation or other lateral movement of the traverse rod. The cam element 24 has a cam groove 28 for guiding rollers 21, 22.

Referring now to FIG. 2 there is shown a top view of a portion of the machine to better illustrate the invention. The cam groove 28 has a leading wall 31 and an opposed trailing wall 32. The cam rotary motion is in the direction indicated by arrow M and produces a traversing movement of rod 18 as indicated by arrow T until the end of a stroke is reached and there is a reversal of the traverse motion during an interval of high acceleration so that the traverse rod then moves in the direction T' while the cam continues in the same rotary direction M. In the absence of specific means for effecting a contrary result, the roller 21 would be back against the trailing wall 32. In this embodiment, the cam follower roller 21 is shifted to the leading wall 31 prior to reversal of the traverse direction during an interval of nearly zero acceleration by provision of the second roller 22, a spring element 34, connecting link 36 and a pin 38 of the traverse rod head 20. The pin extension 38 is held in fixed relation to the traverse head 20 by a bent washer 40 as described below in connection with FIG. 4. Cam follower roller 21 and second roller 22 are interconnected by link 36 carrying a fixed pin 42 with extension 47. Pin 38 and extension 47 are forced apart by a spring 34.

Spring 34 shown as a hairpin type for simplicity and clarity in FIG. 2, may alternatively comprise a spiral compression spring 34' held between pin 38 and extension 47 by telescoping tube sections 34A and 34B, as shown in FIG. 3. In both embodiments, the spring urges extension 47 and pin 38 apart subject to the further constraints that pin 38 is fixed in relation to traverse head 20, that the distance between axle 23 and pin 42 is fixed by link 36 and that rollers 21 and 22 are limited in their movements by contact with the walls 31 and 32 of groove 28.

If cam follower roller 21 were used as the sole follower element (as in prior art machines) it would tend to bear against trailing wall 32. The construction according to the invention, causes second roller 22 to press back against trailing wall 32 and cam follower roller 21 to move against leading wall 31 in the course of (usually at the beginning of) traverse in the direction indicated by arrow T.

Referring also to FIG. 2 there is shown the cam groove and follower orientation (illustrated in dashed line) at a later point in time, on the order of milliseconds, when cam 24 continuing its tangential movement in the direction M, has passed the limit of its reach to the right side of FIG. 1 and wherein continued rotation over the next 180° will establish the cam position shown in chain lines in FIG. 1. Traverse rod 18 has begun traversing movement in the direction T'. Wall 32 of groove 28 has become the leading wall and wall 31 has become the trailing wall. The cam follower roller 21 has been pressed forward to contact the new leading wall 32 by the reaction of the second roller 22 against the new trailing wall 31. In the course of effecting such a shift from the position at the first time to that at the second time, the spring 34 rotates nearly 180°.

Referring to FIG. 4, there is shown an exploded perspective view of the exemplary embodiment of the invention illustrating all the parts of the cam follower assembly including said rollers 21 and 22, axle 23, pin 42, and its extension 47, spring 34 and its bushings 43 and 49, link 36, washer 40, pin 38, snap rings 39, 45 and 51, traverse rod 18, and traverse head 20. Washer 40 is bent to engage a portion 44 thereof over the back side face 46 of head 20 and has a hole 48 which passes axle 23 that is rigidly mounted in head 20; this construction prevents washer 40 from rotating. Pin 38 extends up from the washer 40 when the parts are assembled.

The axle 23 passes down through the hole in washer 40 through the sleeve 37 in one end of link 36 and through the steel cam follower roller 21 which is held in position by snap ring 39. Pin 42 in link 36 passes down through secondary roller 22 which is held in position by snap ring 41. Pin 38 in washer 40 passes up through bushing 43 of spring 34 which is held in place by snap ring 45. Extension 47 of pin 42 extends upward through bushing 49 of spring 34, which is held in place by snap ring 51 which completes the assembly of this exemplary embodiment.

The above-described embodiments may be incorporated in design of new coning machines or applied to existing coning machines as a retrofit. The primary roller 21 is preferably made of steel and the secondary roller 22 is preferably made of a resilient low density material having high damping constant, such as polyurethane.

The coner of the present invention achieves a low noise and low vibration operation, compared to prior art coners without sacrificing usual coner operating speeds or other capabilities and without substantial increase in number of parts or cost. The above described spring assembly allows stopping in the middle of a traverse and restart and performs in all respects as the unmodified assembly except quieter and with reduced impulsive forces in gear train and in connected parts of the machine.

A slight but substantially imperceptible impact is produced in shifting rollers 21 and 22 as described above in connection with FIGS. 2 and 3. Such impact involves small forces, low velocities and therefore little impact. The force of spring 34 (FIG. 2) or 34A (FIG. 3), or of other spring or shifting means such as an elastomer which may be employed, only has to overcome the friction of the traverse motion and fiber drag and provide sufficient force to accelerate the cam follower roller from one groove wall to the other within the time period of a traverse stroke. This spring force is much less than the force required to produce the acceleration of the traverse assembly at each reversal, is entirely between the cam and traverse assembly and the mechanism producing this force adds negligible mass to the oscillating system.

For some purposes the cam following roller 21 may preferably be replaced by a cam following slider and/or the second roller 22 may be replaced by a slider and/or a slider may be used in conjunction with second roller 22 without altering the intent and scope of the foregoing disclosure.

FIG. 4A is a perspective view of an elastomer element 34'' made of rubber or other suitable resilient material which may be substituted for spring 34. FIG. 4B is a perspective view of a pair of sliders 21' and 22' which may be substituted for rollers 21 and 22.

As still another alternative, the principles of the invention may be applied to a camming system in which grooved cam follower slides ride upon a guiding rail, or alternatively, a pair of rollers is substituted for each grooved slider. The leading and trailing walls would then be raised instead of recessed.

It is evident that those skilled in the art may now make numerous other uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. In a cam and cam follower assembly employing a cam surface having opposing first and second walls that guide a reciprocating cam follower means having a leading portion, the improvement comprising, means for establishing one of said walls as a leading wall in contact with said leading portion for most of the path followed by said cam follower means during a traversal of said path and the other as a trailing wall normally free from contact with said leading portion for shifting the cam follower means leading portion from the then leading and next trailing wall to the then trailing and next leading wall prior to the reciprocating motion reversal.

2. The improvement in accordance with claim 1 wherein the cam follower means comprises a first follower at said leading portion and a second follower and said means for shifting comprises, means for urging the first follower against the leading wall and the second follower against the trailing wall during traverse by said cam follower means.

3. The improvement in accordance with claim 2 and further comprising a traversing element coupled to said cam follower means having a fixed lateral extension, and said means for urging comprises means for holding said first and second followers at a fixed distance with respect to each other, and spring means connected between said lateral extension and said second follower.

4. The improvement in accordance with claim 3 wherein said spring means comprises a hairpin spring.

5. The improvement in accordance with claim 3 wherein said spring means comprises a coil spring within means for confining relative displacement between the turns of said coil spring to a direction substantially along the coil spring axis.

6. The improvement in accordance with claim 3 wherein said spring means is an element made of resilient material.

7. The improvement in accordance with claim 2 wherein said first and second followers comprise rollers and further comprising a traversing element having an axle carrying said first roller comprising and having a fixed lateral extension, said fixed lateral extension having a pin at a distance from the first roller axle, linking means having a second roller axle for carrying said second roller, and spring means connected between the pin and the second roller axle comprising said means for urging.

8. The improvement in accordance with claim 2 wherein said first and second followers comprise slides and further comprising a traversing element coupled to said cam follower means having a fixed lateral extension, said fixed lateral extension having an axle carrying said first slide and a pin at a distance from the first slide axle, linking means having a second slide axle for carrying said second slide, and spring means connected between the pin and the second slide axle comprising said means for urging.

9. A method of operating the improvement of claim 1 which method includes the steps of positioning said cam follower means leading portion during intervals of nearly zero acceleration in contact with that one of said walls that next becomes the leading wall and forcing surface to produce high acceleration of said cam follower means.

10. The improvement in accordance with claim 1 in which a cam and cam follower system cause a traverse assembly to execute substantially linear back and forth motions with high accelerations at each reversal but nearly zero acceleration along linear portions of the traverse between reversals during intervals between reversals in acceleration with the means for shifting including means for shifting the leading portion from one wall to the other during the intervals of nearly zero acceleration.

* * * * *